(12) United States Patent
Jang

(10) Patent No.: US 11,017,696 B2
(45) Date of Patent: May 25, 2021

(54) DISPLAY DEVICE AND METHOD FOR FABRICATING ELECTRONIC DEVICE USING THE SAME

(71) Applicant: Samsung Display Co., Ltd., Yongin-si (KR)

(72) Inventor: Namjin Jang, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/562,360

(22) Filed: Sep. 5, 2019

(65) Prior Publication Data

US 2020/0135063 A1    Apr. 30, 2020

(30) Foreign Application Priority Data

Oct. 24, 2018    (KR) ........................ 10-2018-0127513

(51) Int. Cl.
*G06F 1/16*        (2006.01)
*G09F 9/30*        (2006.01)

(52) U.S. Cl.
CPC ............ *G09F 9/301* (2013.01); *G06F 1/1626* (2013.01); *G06F 1/1652* (2013.01)

(58) Field of Classification Search
None
See application file for complete search history.

(56) References Cited

U.S. PATENT DOCUMENTS

| 9,146,590 | B2* | 9/2015 | Myers | G06F 1/1633 |
| 9,189,016 | B2* | 11/2015 | Jang | G06F 1/1637 |
| 10,304,917 | B2* | 5/2019 | Hayk | H01L 51/5203 |
| 10,627,946 | B2* | 4/2020 | Bian | G06F 3/041 |
| 10,680,210 | B2* | 6/2020 | Lee | H01L 51/5237 |
| 2012/0314383 | A1* | 12/2012 | Oohira | G02F 1/13452 361/749 |
| 2013/0002133 | A1* | 1/2013 | Jin | H01L 27/3267 313/511 |
| 2014/0320762 | A1* | 10/2014 | Jeong | G06F 3/041 349/12 |
| 2015/0331451 | A1* | 11/2015 | Shin | G06F 1/1626 345/173 |
| 2018/0063942 | A1 | 3/2018 | Kim et al. | |
| 2018/0088736 | A1* | 3/2018 | Jeong | H01L 27/323 |
| 2018/0196300 | A1 | 7/2018 | Jung et al. | |

FOREIGN PATENT DOCUMENTS

| KR | 20-0412670 Y1 | 3/2006 |
| KR | 10-2018-0025418 A | 3/2018 |
| KR | 10-2018-0083025 A | 7/2018 |

* cited by examiner

*Primary Examiner* — Anthony Q Edwards
*Assistant Examiner* — Rashen E Morrison
(74) *Attorney, Agent, or Firm* — Lewis Roca Rothgerber Christie LLP

(57) ABSTRACT

A display device includes a window, a display module on a rear surface of the window and including a non-bending area and a bending area configured to bend at a periphery of the non-bending area, a protective cover on a rear surface of the display module to protect the bending area of the display module, and a stopper coupled with the protective cover to limit a movement of the window.

19 Claims, 15 Drawing Sheets

DISPLAY DEVICE AND METHOD FOR FABRICATING ELECTRONIC DEVICE USING THE SAME

CROSS-REFERENCE TO RELATED APPLICATION

This patent application claims priority to and the benefit of Korean Patent Application No. 10-2018-0127513, filed in the Korean Intellectual Property Office on Oct. 24, 2018, the entire contents of which are incorporated herein by reference.

BACKGROUND

1. Field

Embodiments of the present disclosure herein relate to a display device and a method of manufacturing an electronic device using the same, and for example, to a display device having a reduced number or degree of defects and a method of manufacturing an electronic device using the same.

2. Description of Related Art

Electronic devices such as smart phones, tablets, notebook computers, and smart televisions are under development. Examples of these electronic devices include a display device for providing information. The electronic devices further include various electronic modules in addition to the display device.

A display device and electronic modules can be assembled to manufacture an electronic device. For example, the electronic modules housed in an external case and a bracket of the electronic device.

SUMMARY

Embodiments of the present disclosure relate to a display device capable of protecting the bending area of a display module during transferring or bending.

Embodiments of the present disclosure also relate to a method of manufacturing an electronic device using a display device having a reduced number or degree of defects.

An exemplary embodiment of the present disclosure provides a display device including: a window; a display module on a rear surface of the window and including a first area and a second area configured to bend at a periphery of the first area; a protective cover on a rear surface of the display module to protect the second area of the display module; and a stopper coupled with the protective cover to limit a movement of the window.

In an exemplary embodiment, the stopper may include a protruding portion protruding from the protective cover.

In an exemplary embodiment, the protruding portion may include: a first protruding portion protruding from the protective cover in a first direction parallel to a first periphery of the window; and a second protruding portion obliquely extending from the first protruding portion in a second direction different from the first direction.

In an exemplary embodiment, the window may include a strength reinforcing portion provided on a corner of the window adjacent the first periphery.

In an exemplary embodiment, the second protruding portion may overlap the strength reinforcing portion and may be engaged with the strength reinforcing portion to limit a movement of the window.

In an exemplary embodiment, the window may further include a base layer, wherein the strength reinforcing portion may protrude from the base layer to increase a thickness of the window at the corner.

In an exemplary embodiment, the protective cover may include: a cover portion on a rear surface of the display module; and a support portion extending from the cover portion and supporting the window.

In an exemplary embodiment, the support portion may include: a bottom portion coupled to the cover portion; and a support bar protruding from the bottom portion and having an upper end where a seating surface supports the window.

In an exemplary embodiment, the protective cover may further include a fixing portion that affixes the protective cover to the rear surface of the display module.

In an exemplary embodiment, the fixing portion may have a plate shape and face the rear surface of the display module.

In an exemplary embodiment, the protective cover may further include a double-sided adhesive member that affixes the fixing portion to the rear surface of the display module.

In an exemplary embodiment, the protective cover may further include a connection portion extending from a side of the cover portion and coupling the fixing portion and the cover portion.

In an exemplary embodiment, the stopper may include a protruding portion protruding from the protective cover in a first direction parallel to a first periphery of the window, wherein the window may include a strength reinforcing portion provided on a corner of the window adjacent the first periphery.

In an exemplary embodiment, the protruding portion may overlap the strength reinforcing portion, and may be engaged with the strength reinforcing portion to limit a movement of the window.

In an exemplary embodiment, the window may further include a base layer, wherein the strength reinforcing portion may protrude from the base layer to increase a thickness of the window at the corner portion.

In an exemplary embodiment, the display module may include: a display panel on the rear surface of the window, and located to correspond with the first area and the second area; and an input sensing unit between the window and the display panel.

In an exemplary embodiment, the second area may include: a curvature area adjacent to the first area; and a facing area adjacent to the curvature area and facing the first area.

In an exemplary embodiment, the protective cover may include: a cover portion on a rear surface of the display module; and a support portion extending from the cover portion and supporting the window.

In an exemplary embodiment, the stopper may be engaged with the window to maintain a first interval between the curvature area and the support portion.

In an exemplary embodiment of the present disclosure, a manufacturing method of an electronic device includes: providing a display device including a window, a display module, a protective cover covering a portion of the display module and a stopper coupled with the protective cover; removing the protective cover from the display device; and coupling the display module with components of an electronic device. The display module is disposed on a rear surface of the window and including a first area and a second area configured to bend at a periphery of the first area, the protective cover disposed on a rear surface of the display module to protect the second area of the display module, and the stopper limits a movement of the window.

BRIEF DESCRIPTION OF THE DRAWINGS

The accompanying drawings are included to provide a further understanding of the subject matter of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

Figure 1:
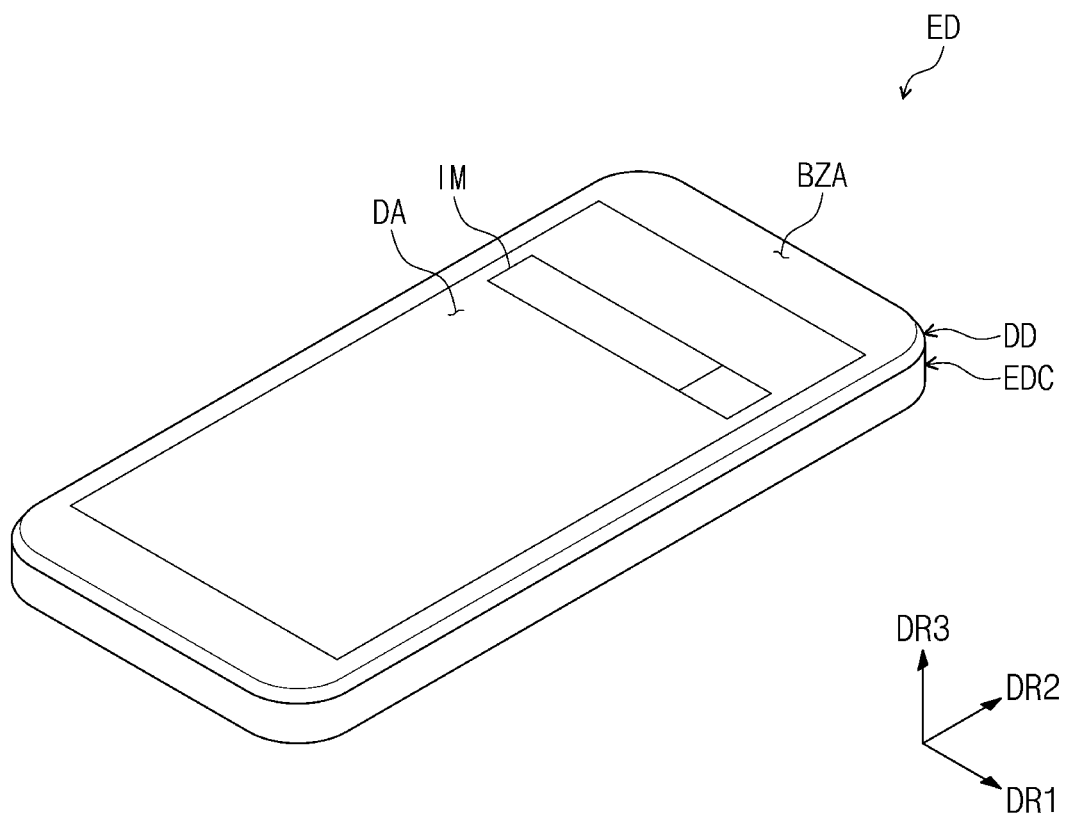
FIG. 1 is a perspective view of an electronic device according to an exemplary embodiment of the present disclosure.

In this specification, when a component (or, an area, a layer, a part, etc.) is referred to as being "on," "coupled to," "connected to," or "combined to" another component, this means that the component may be directly on, coupled to, connected to, or combined to the other component or a third component therebetween may be present. In addition, it will also be understood that when an element or layer is referred to as being "between" two elements or layers, it can be the only element or layer between the two elements or layers, or one or more intervening elements or layers may also be present.

Like reference numerals refer to like elements. Additionally, in the drawings, the thicknesses, proportions, and dimensions of components may be exaggerated for clarity of illustration.

"And/or" includes all of one or more combinations defined by related components. Expressions such as "at least one of," when preceding a list of elements, modify the entire list of elements and do not modify the individual elements of the list.

It will be understood that the terms "first" and "second" are used herein to describe various components but these components should not be limited by these terms. The above terms are used only to distinguish one component from another. For example, a first component may be referred to as a second component and vice versa without departing from the scope of the present disclosure. The singular expressions include plural expressions unless the context clearly dictates otherwise.

In addition, as used herein, terms such as "below", "the lower side", "on", and "the upper side" are used to describe a relationship of configurations shown in the drawing. The terms are described as a relative concept based on a direction shown in the corresponding drawing.

In various embodiments of the present disclosure, the terms "include," "comprise," "including," or "comprising," specify a property, a region, a fixed number, an, a process, an element and/or a component but does not exclude other properties, regions, fixed numbers, acts, processes, elements and/or components.

Hereinafter, embodiments of the present disclosure will be described with reference to the drawings.

FIG. 1 is a perspective view of an electronic device ED according to an exemplary embodiment of the present disclosure.

Referring to FIG. 1, a smart phone is shown as an example of the electronic device ED in the present embodiment, but the present disclosure is not limited thereto. In an embodiment of the present disclosure, the electronic device ED may be a tablet, a notebook computer, a smart television, or the like.

As shown in FIG. 1, the display surface where the image IM is displayed is parallel to (e.g., substantially parallel to) the plane defined by the first direction axis DR1 and the second direction axis DR2. The display surface may include a display area DA and a bezel area BZA adjacent to the display area DA. An Internet search window is shown as an example of the image IM in FIG. 1. As one example, the display area DA may have a rectangular (e.g., substantially rectangular) form. The bezel area BZA may surround the display area DA. In other words, the bezel area BZA forms the outline of the display surface.

The normal direction perpendicular to (e.g., substantially perpendicular to) the display surface, for example, the thickness direction of the electronic device ED, is indicated by the third directional axis DR3. The front surface (or upper surface or first surface) and the rear surface (or lower surface, bottom surface, or second surface) of each member are defined based on the direction in which the image IM is displayed. However, the directions that the first to third direction axes DR1, DR2, and DR3 indicate may be converted to other directions as a relative concept. Hereinafter, first to third directions refer to the same reference numerals of the respective directions that the first to third direction axes DR1, DR2, and DR3 indicate.

The electronic device ED may include a display device DD and an external case EDC. The display device DD will be described herein below with reference to FIGS. 2 and 3.

The external case EDC may be coupled to the display device DD. The external case EDC may provide an external surface of the electronic device ED. In this embodiment, although the external case EDC composed of a single body is shown as an example, the external case EDC may include a plurality of bodies assembled with each other. The external case EDC may include a plurality of frames and/or plates made of glass, plastic, or metal.

Figure 2:
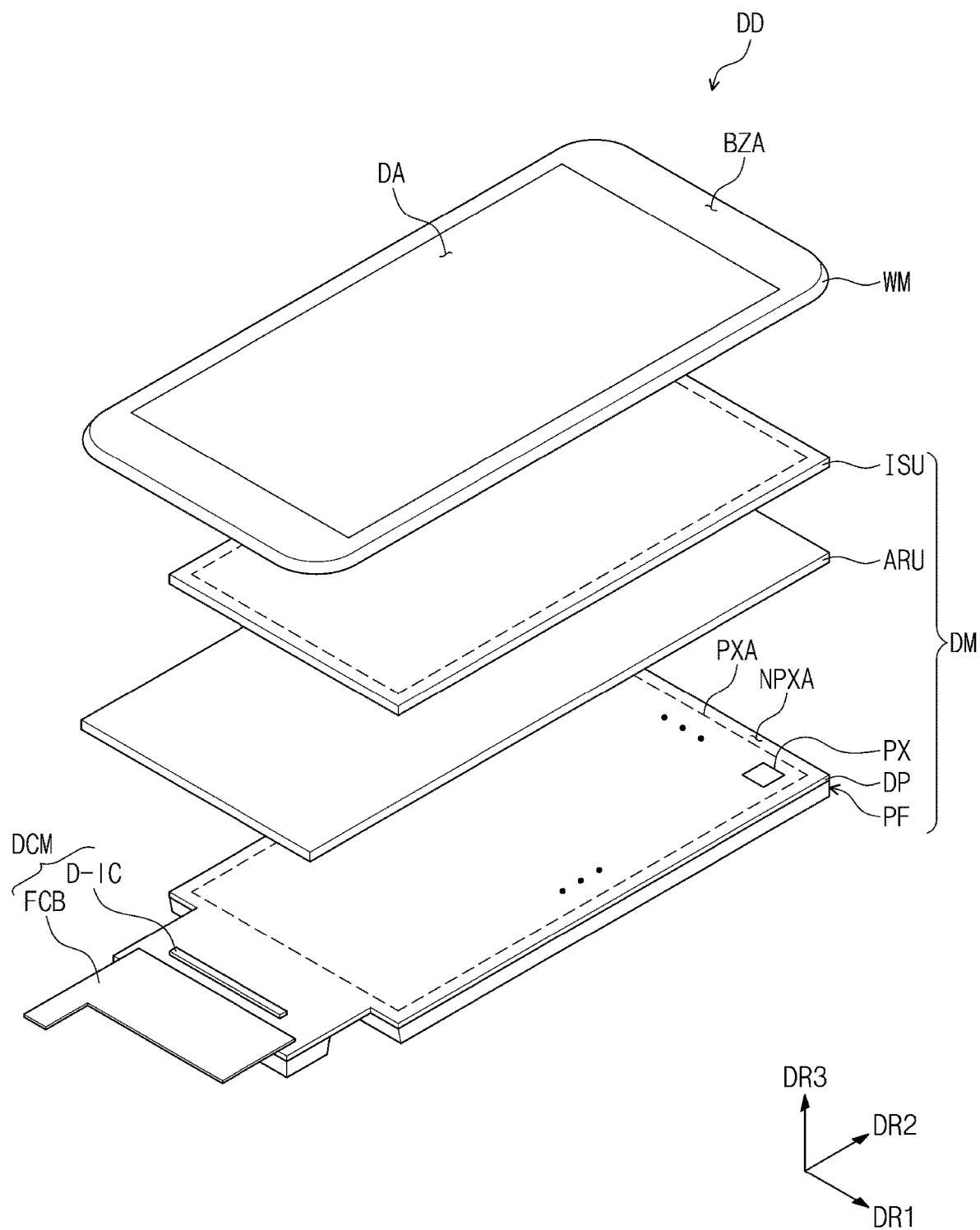
FIG. 2 is an exploded perspective view of an electronic device according to an exemplary embodiment of the present disclosure.
Figure 3:
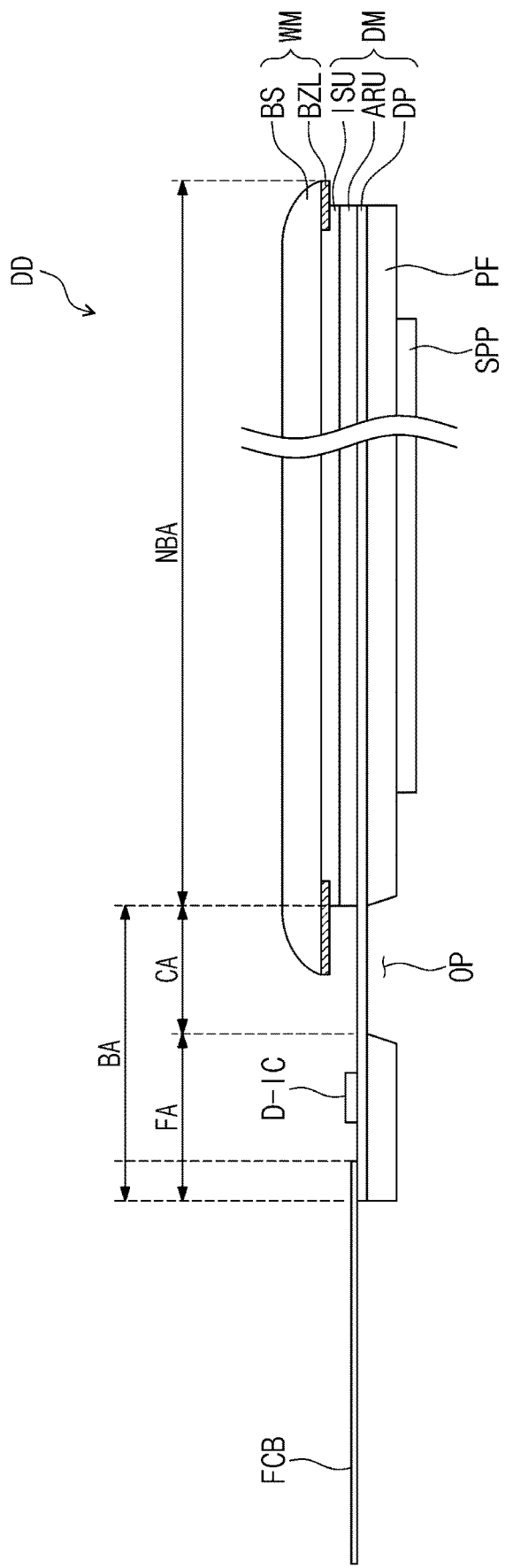
FIG. 3 is a cross-sectional view of the display device shown in FIG. 2.

FIG. 2 is an exploded perspective view of a display device DD according to an exemplary embodiment of the present disclosure. FIG. 3 is a cross-sectional view of the display device shown in FIG. 2.

As shown in FIG. 2, the display device DD may include a window WM and a display module DM. The window WM includes a base layer BS and a bezel layer BZL on the rear surface of the base layer BS. An area where the bezel layer BZL is defined as the bezel area BZA shown in FIG. 1. In the present embodiment, the window WM has a flat shape in the display area DA, but the present disclosure is not limited thereto, and the shape of the window WM may be modified. The periphery (e.g., edges) of the window WM may provide a curved surface.

The base layer BS may include a glass substrate, a sapphire substrate, a plastic substrate, and/or the like. The base layer BS may have a multi-layer or single-layer structure. For example, the base layer BS may include a plurality of plastic films bonded together with an adhesive. The base layer BS may include a glass substrate and a plastic film bonded to the glass substrate with an adhesive member.

The bezel layer BZL may have a single-layer or multi-layer structure. The bezel layer BZL with a multi-layer structure may include a buffer layer for improving adhesion, a pattern layer for providing a set or predetermined pattern, and an achromatic layer. The pattern layer may provide a pattern referred to as a hairline. The achromatic layer may include an organic mixture including a black pigment or dye. The layers may be formed by vapor deposition, printing, coating, and/or the like. In some embodiments, the window WM may further include a functional coating layer at the front surface of the base layer BS. The functional coating layer may include an anti-fingerprint layer, anti-reflective layer, and/or a hard coating layer.

The display module DM may include a display panel DP, an input sensing unit ISU, an anti-reflection unit ARU, a protective film PF, and a drive control module DCM. FIGS. 2 and 3 show a display panel DP in an unfolded state.

The display panel DP may be a flexible display panel, for example, an organic light emitting display panel. The display panel DP includes a pixel area PXA where a pixel PX is on a plane and a non-pixel area NPXA adjacent to the pixel area PXA. The pixel PX is not in the non-pixel area NPXA, and peripheral components such as signal lines and banks are located. The pixel area PXA corresponds to the display area DA, and the non-pixel area NPXA corresponds to the bezel area BZA. However, the corresponding areas (e.g., shape/area, etc.) may not be completely identical to one another.

The input sensing unit ISU may obtain coordinate information of an external input. The input sensing unit ISU may sense various suitable types (or kinds) of inputs provided from outside the electronic device ED. For example, the input sensing unit ISU may recognize inputs by the user's body and/or recognize various suitable types (or kinds) of external inputs such as light, heat, and/or pressure. In addition, the input sensing unit ISU may sense not only the input contacting the sensing surface, but also the input close to the sensing surface.

The anti-reflection unit ARU may include a polarizing film and/or a phase retardation film. The number of phase retardation films and the phase retardation length ($\lambda/4$ or $\lambda/2$) of the phase retardation film may be determined according to the operation principle of the anti-reflection unit ARU. The anti-reflection unit ARU may include color filters.

In this embodiment, although the input sensing unit ISU and the anti-reflection unit ARU are shown separately from the display panel DP, at least one of the input sensing unit ISU and the anti-reflection unit ARU may be integrated into the display panel DP through a continuous process. At least one selected from the input sensing unit ISU and the anti-reflection unit ARU may be omitted.

In an embodiment of the present disclosure, the input sensing unit ISU is on the rear surface of the window WM. The anti-reflection unit ARU is on the rear surface of the input sensing unit ISU. The display panel DP is on a rear surface of the anti-reflection unit ARU. In another embodiment of the present disclosure, the positions of the anti-reflection unit ARU and the input sensing unit ISU may be interchanged.

The protective film PF may be attached to a rear surface of the display panel DP to support and protect the display panel DP. The protective film PF may include a plastic film as a base layer. The protective film PF may include a plastic film including any one selected from the group consisting of a thermoplastic resin, for example, polyethyeleneterephthalate (PET), polyethylene (PE), polyvinylchloride (PVC), polypropylene (PP), polystyrene (PS), polyacrylonitrile (PAN), styrene-acrylonitrile copolymer (SAN), acrylonitrile-butadiene-styrene (ABS), and polymethyl methacrylate (PMMA), and a combination thereof. For example, the polyethylene terephthalate (PET) is excellent in heat resistance, and excellent in stress intensity and electrical characteristics, and less affected by temperature and humidity, as compared to other plastic films.

A material constituting the protective film PF is not limited to plastic resins and may include an organic/inorganic composite material. The protective film PM may include an inorganic material filled in the pores of a porous organic layer and an organic layer. In an embodiment of the present disclosure, the protective film PF may be made of a hydrophilic material.

The drive control module DCM may include a circuit board FCB coupled to (e.g., connected to) the display panel DP and a driving chip D-IC mounted on the display panel DP. In some embodiments, a plurality of passive elements and active elements may be mounted on the circuit board FCB. The circuit board FCB may be a flexible circuit board. The circuit board FCB may be attached to one end of the display panel DP and electrically coupled to (e.g., electrically connected to) the display panel DP. In FIGS. 2 and 3, the circuit board FCB has a single-layer structure, but is not limited thereto. The circuit board FCB may have a structure in which a plurality of layers are stacked.

In this embodiment, although it is shown that the drive control module DCM has a structure with a single circuit board FCB, the drive control module DCM may include two circuit boards (first and second circuit boards). In this case, a plurality of passive elements and active elements may be mounted on the first circuit board, and a driving chip D-IC may be mounted on the remaining second circuit board. The second circuit board is provided between the display panel DP and the first circuit board, and may electrically couple (e.g., electrically connect) them.

Further, in this exemplary embodiment, a chip-on-panel (COP) structure in which the driving chip D-IC is mounted on the display panel DP is shown. However, the present disclosure is not limited thereto. For example, the display device DD may have a chip-on-film (COF) structure in which the driving chip D-IC is mounted on the circuit board FCB.

In FIG. 3, for convenience of explanation, the display panel DP is simply shown as a single layer, but the display panel DP actually includes a plurality of layers.

Figure 4:
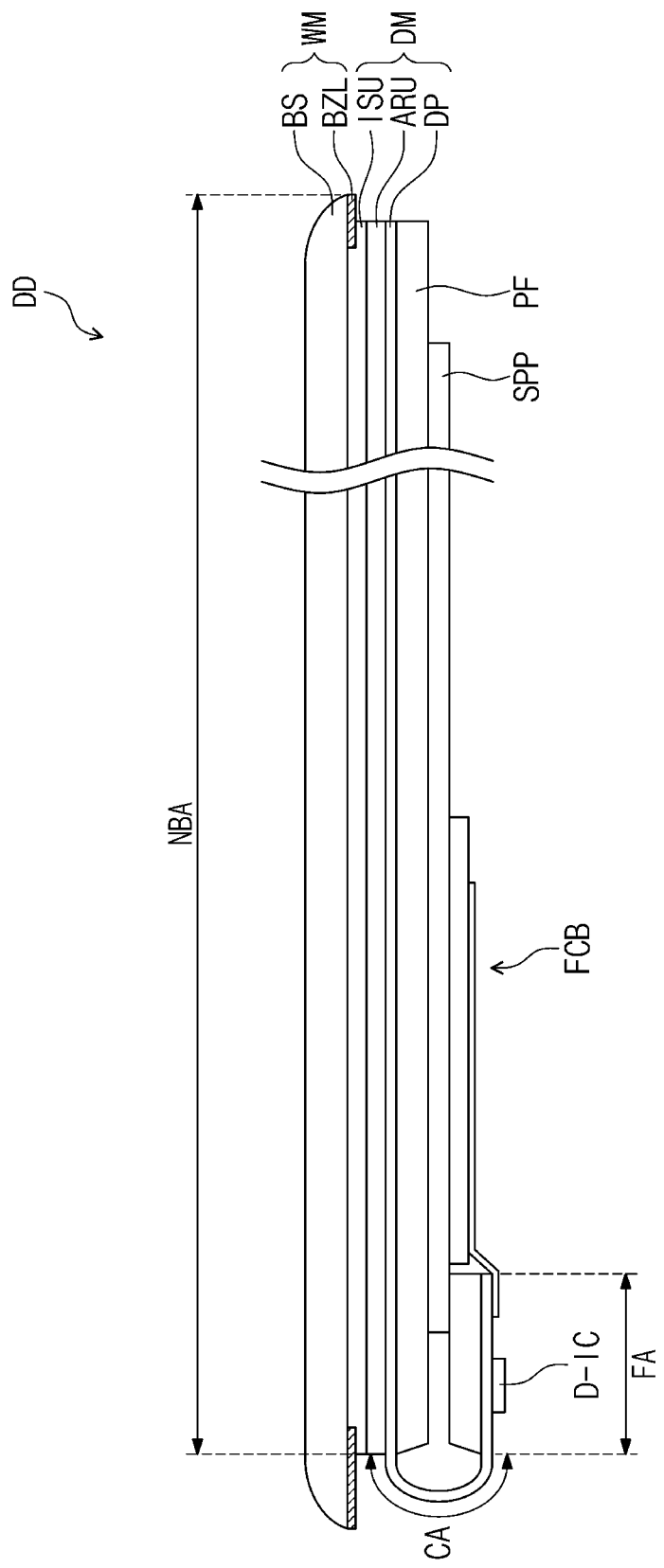
FIG. 4 is a side view showing a bending state of the display device shown in FIG. 3.
Figure 5:
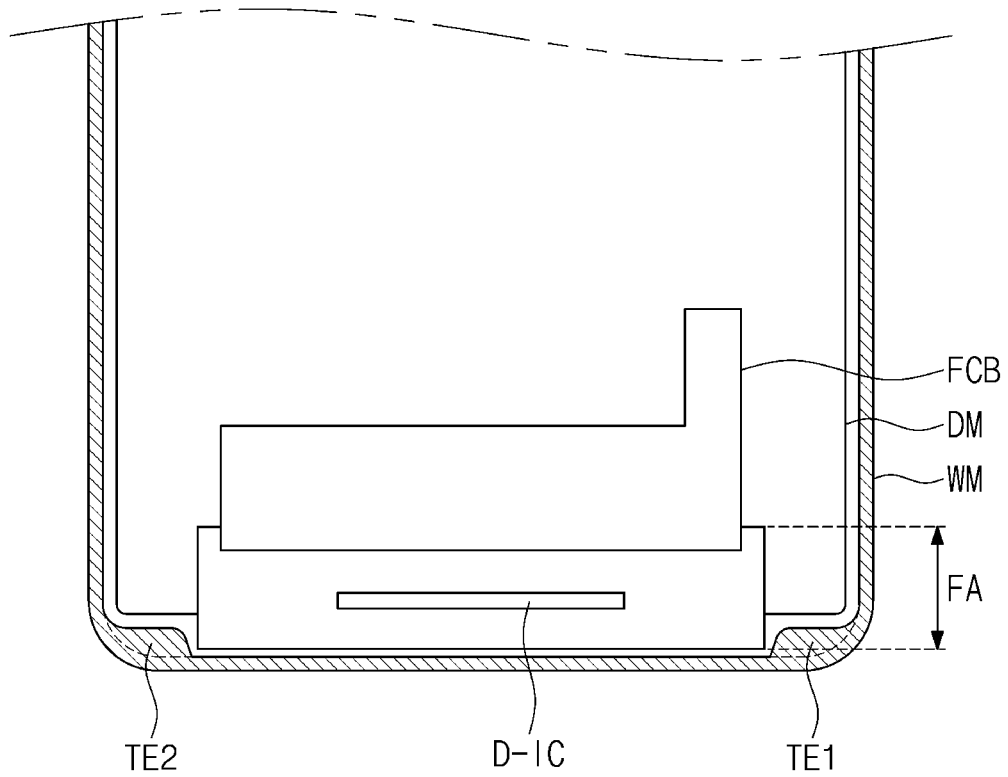
FIG. 5 is a rear surface view of the display device shown in FIG. 4.

FIG. 4 is a side view showing a bending state of the display device shown in FIG. 3, and FIG. 5 is a rear surface view of the display device shown in FIG. 4.

Referring to FIGS. 3-5, the display module DM may include a first area and a second area. For example, the display module DM may be divided into a non-bending area NBA corresponding to the first area and a bending area BA corresponding to the second area. The bending area BA may include a curvature area CA having a set or predetermined curvature in a bending state and a facing area FA facing the non-bending area NBA in a bending state. The curvature area CA is adjacent to the non-bending area NBA and is a substantially curved area. The facing area FA is an area adjacent to the curvature area CA and not having a curvature. The facing area FA faces the non-bending area NBA and is spaced apart from the non-bending area NBA. The circuit board FCB is coupled to (e.g., connected to) the facing area FA, and the driving chip D-IC may be mounted thereon.

The protective film PF is located to correspond with to the non-bending area NBA and the facing area FA and may not be in the curvature area CA. An open portion OP may be defined in the protective film PF to correspond to the curvature area CA. As the protective film PF is removed from the curvature area CA, it is possible to reduce the stress generated in the curvature area CA at the time of bending. In an embodiment of the present disclosure, the protective film PF may have a groove defined to correspond to the curvature area CA. For example, the protective film PF may be formed thinner than the other areas NBA and FA in the curvature area CA.

As an example of the present disclosure, the display module DM may further include a support panel SPP. The support panel SPP supports the display panel DP on the rear surface of the protective film PF. The support panel SPP may be a stainless steel plate. The support panel SPP may have a black color to shield or block external light incident on the display panel DP.

When the curvature area CA of the display module DM is bent, the facing area FA faces the non-bending area NBA, and the circuit board FCB coupled to (e.g., connected to) the facing area FA is located parallel to (e.g., substantially parallel to) the non-bending area NBA of the display panel DP. A portion of the support panel SPP may overlap between the facing area FA and the non-bending area NBA. Also, after the display module DM is bent, the circuit board FCB may be seated on the rear surface of the support panel SPP.

In the display device DD according to an embodiment of the present disclosure, the drive control module DCM further includes a cover film for covering the circuit board FCB. The cover film covers the upper surface of the circuit board FCB and the facing area FA of the display module DM. In the present embodiment, a plurality of elements are mounted on the upper surface of the circuit board FCB, and the driving chip D-IC is mounted on the facing area.

The cover film may be an adhesive film attached to protect elements mounted on the upper surface of the circuit board FCB and the driving chip D-IC in the process of manufacturing the electronic device ED. When the manufacturing process of the display device ED is completed, the cover film may be removed from the circuit board FCB and the display module DM.

In the display device DD according to an embodiment of the present disclosure, the window WM may further include strength reinforcing portions TE1 and TE2. The strength reinforcing portions TE1 and TE2 may include a first strength reinforcing portion TE1 and a second strength reinforcing portion TE2.

The first and second strength reinforcing portions TE1 and TE2 may be provided to two corner portions of the window WM, respectively. In some embodiments, the window WM may further include a strength reinforcing portion provided at another corner portion other than the two corner portions shown in FIG. 5.

The first strength reinforcing portion TE1 may be formed in a structure protruding from the lower surface of the base layer BS at the first corner portion of the window WM. Thus, the thickness of the first corner portion of the window WM is increased by the first strength reinforcing portion TE1. The second strength reinforcing portion TE2 may be formed in a structure protruding from the lower surface of the base layer BS at the second corner portion of the window WM. Thus, the thickness of the second corner portion of the window WM is increased by the second strength reinforcing portion TE2. In such a manner, the first and second strength reinforcing portions TE1 and TE2 increase the thickness at the first and second corner portions of the window WM to reinforce the strength of the corner portion vulnerable to damage, such that the damage to the window WM may be prevented or reduced.

Figure 6:
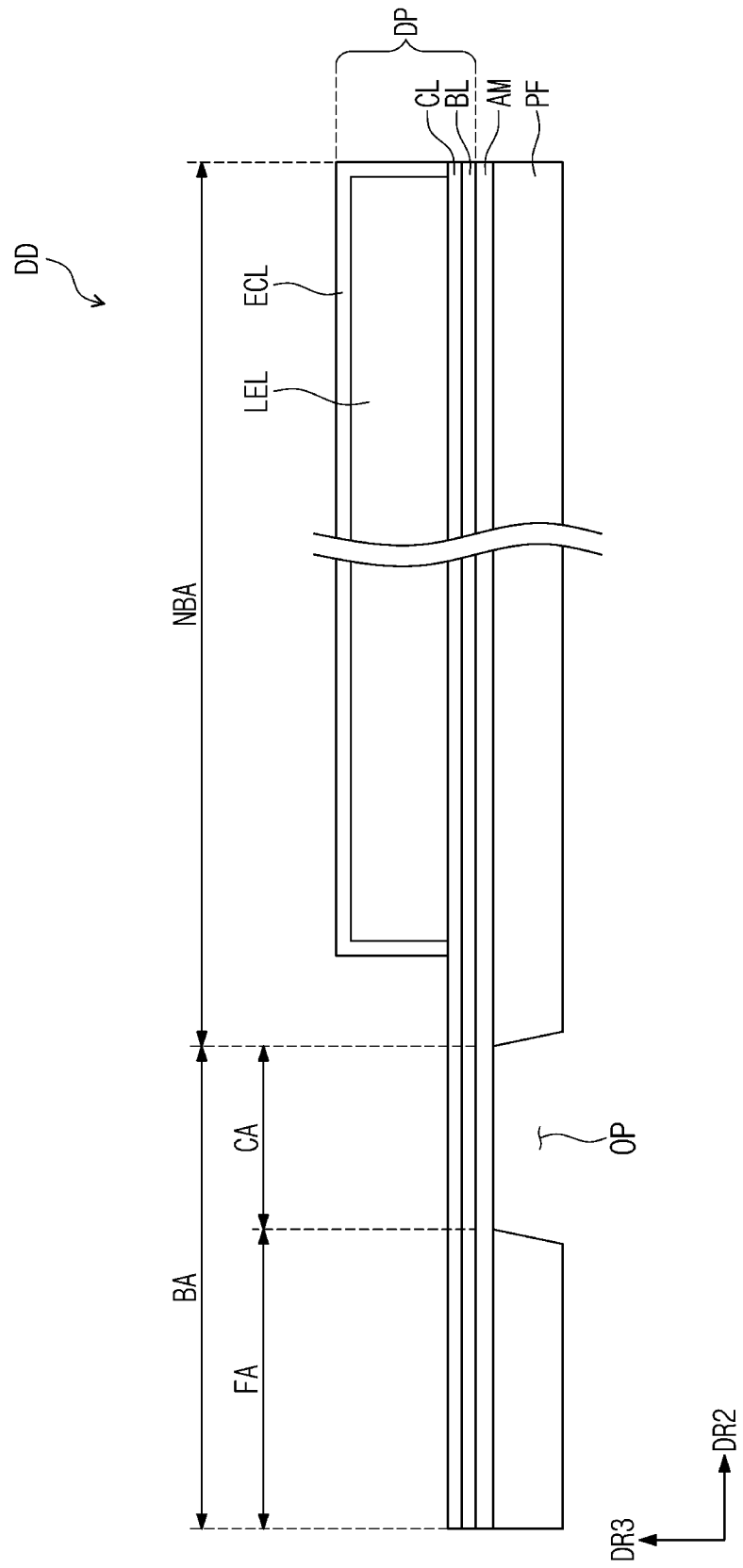
FIG. 6 is a partially enlarged sectional view of the display module shown in FIG. 3.

FIG. 6 is a partially enlarged sectional view of the display panel shown in FIG. 3.

Referring to FIG. 6, the display panel DP may include a base layer BL, a circuit layer CL, an element layer LEL, and an encapsulation layer ECL.

The base layer BL may include, for example, polyimide (PI) as a resin layer, and the material thereof is not particularly limited. The circuit layer CL is on the front surface of the base layer BL. The circuit layer CL has a multi-layer structure including an insulating layer, a conductive layer, and a semiconductor layer. The circuit layer CL may include a pixel circuit and signal lines coupled to (e.g., connected to) the pixel circuit in addition to thin film transistors.

The element layer LEL is on the front surface of the circuit layer CL. The element layer LEL may include a light emitting element, for example, an organic light emitting element. The encapsulation layer ECL is on the element layer LEL to seal the element layer LEL. The sealing layer ECL may have an organic/inorganic film multi-layer structure referred to as thin film encapsulation (TFE) layer. In another exemplary embodiment, the encapsulation layer ECL may include only an inorganic film, or may include only an organic film. The display panel DP may include an encapsulation substrate and a sealant, which replace the encapsulation layer ECL. The sealant may bond the encapsulation substrate to the element layer LEL.

The base layer BL and the circuit layer CL may be to correspond with the non-bending area NBA and the bending area BA. The element layer LEL and the encapsulation layer ECL may be in the non-bending area NBA.

The display panel DP and the protective film PF may be coupled by an adhesive member AM. For example, the rear surface of the base layer BL and the protective film PF may be coupled by the adhesive member AM. The adhesive member AM may be an Optically Clear Adhesive (OCA) film, an Optically Clear Resin (OCR), and/or a Pressure Sensitive Adhesive (PSA) film.

Figure 7:
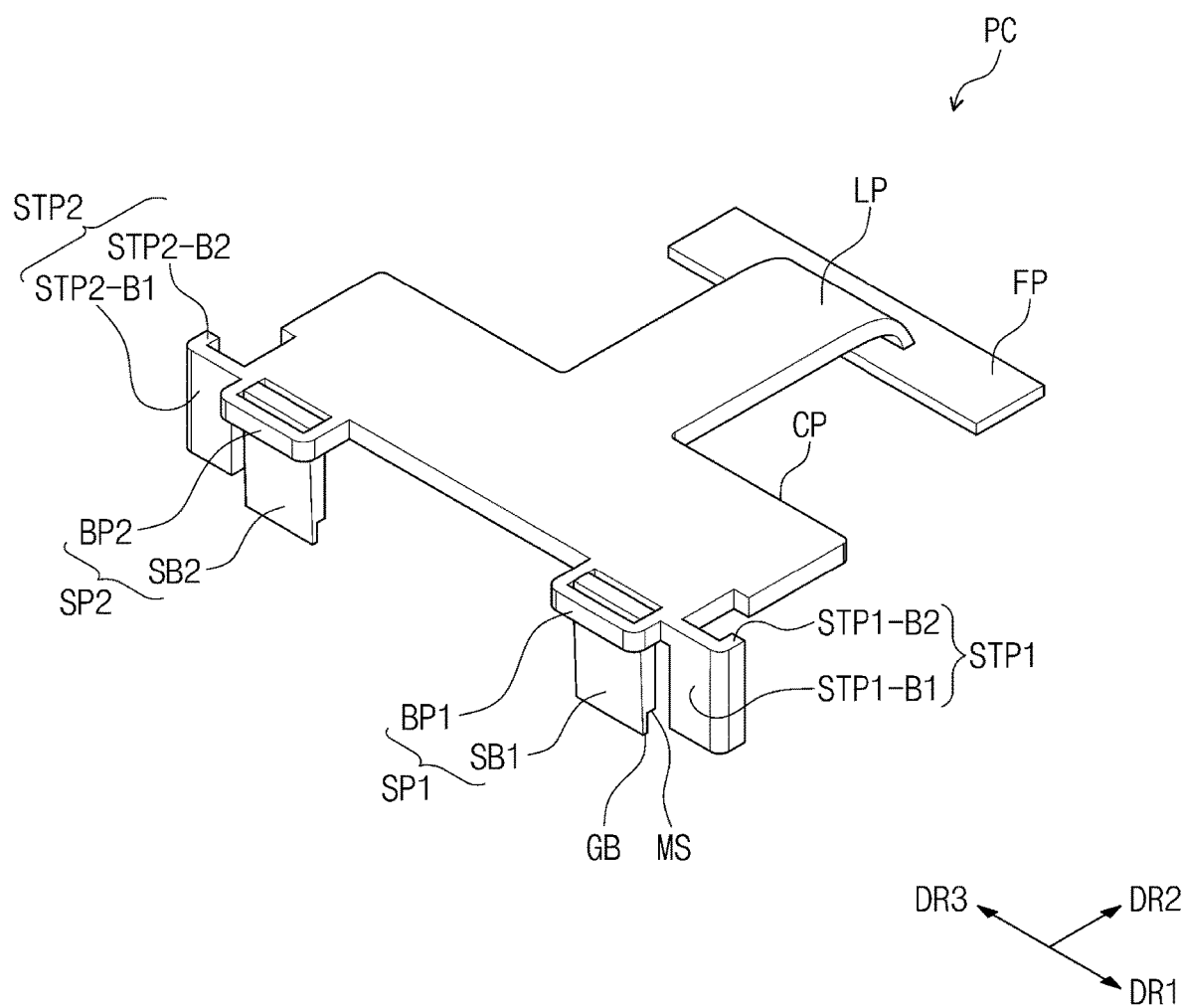
FIG. 7 is a perspective view of a protective color according to an exemplary embodiment of the present disclosure.
Figure 8:
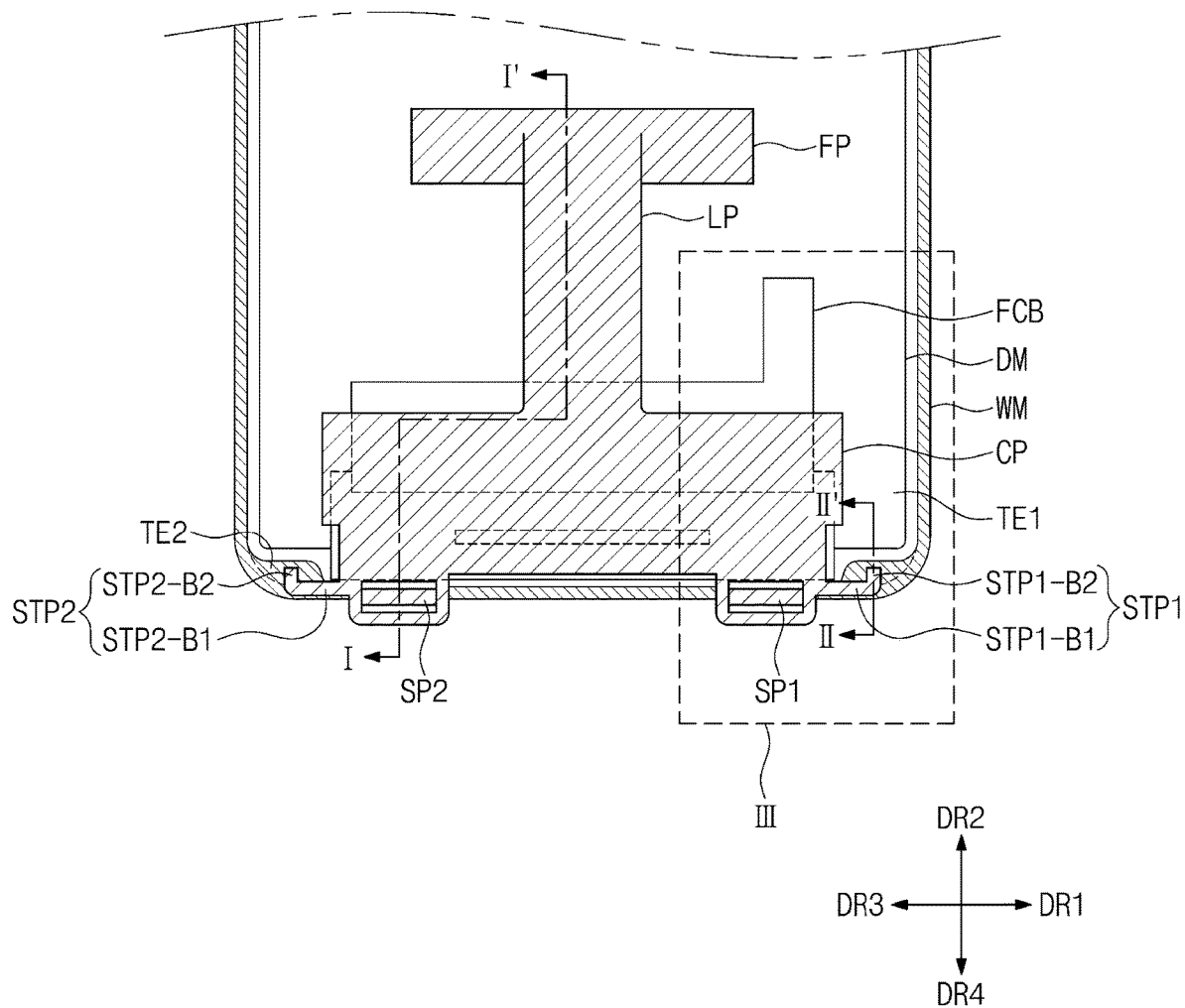
FIG. 8 is a rear surface view of a display device having the protective cover shown in FIG. 7.
Figure 9:
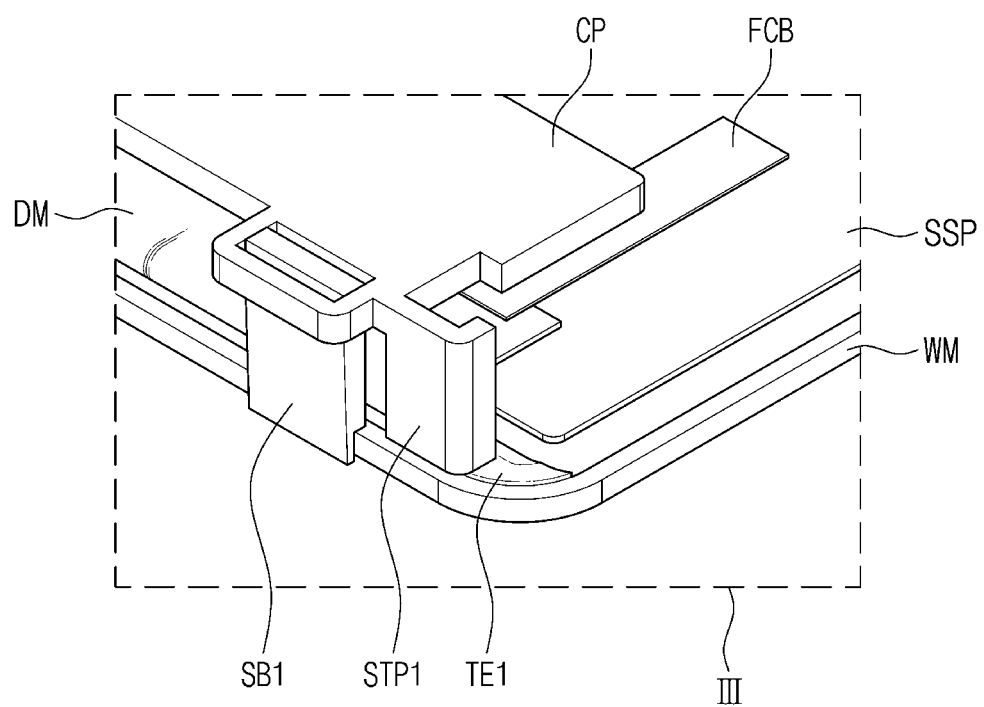
FIG. 9 is an enlarged perspective view of a portion III shown in FIG. 8.

FIG. 7 is a perspective view of a protective cover according to an exemplary embodiment of the present disclosure. FIG. 8 is a rear surface view of a display device having a protective cover shown in FIG. 7. FIG. 9 is an enlarged perspective view of a portion III shown in FIG. 8.

Referring to FIGS. 7-9, the display device DD according to the present embodiment is on the rear surface of the display module DM, thereby further including a protective cover PC covering the bending area BA of the display panel DP. The protective cover PC may cover a portion of the drive control module DCM (see FIG. 2) on the rear surface of the display module DM.

The protective cover PC covers the bending area BA, thereby reducing the number or degree of defects that occur during the transfer of the display device DD. This is because the protective cover PC blocks external impacts and foreign substances.

The protective cover PC may be a plastic member such as polycarbonate. The protective cover PC may be manufactured through any suitable plastic molding methods available in the art such as, for example, extrusion and/or injection molding. However, the material of the protective cover PC is not limited, and the protective cover PC may be a metal member or an organic/inorganic composite material member.

The protective cover PC includes a cover portion CP and a support portion SP1 and SP2. The cover portion CP covers a portion of the bending area BA of the display panel DP and the drive control module DCM. For example, the cover portion CP may cover a portion of the facing area FA and the circuit board FCB.

In FIG. 7, the cover portion CP has a plate shape, but is not limited thereto. For example, the cover portion CP may be formed in a container shape having a groove. In this case, the groove may be formed to have a size suitable to accommodate a portion of the facing area FA of the display panel DP and the circuit board FCB.

The support portion includes a first support portion SP1 and a second support portion SP2 protruding from one side of the cover portion CP. The first support portion SP1 includes a first support bar SB1 for supporting a periphery (e.g., an edge) of the window WM and a first bottom portion BP1 for supporting the first support bar SB1 and coupling (e.g., connecting) the first support bar SB1 to the cover portion CP. The second support portion SP2 includes a second support bar SB2 for supporting the periphery (e.g., the edge) of the window WM and a second bottom portion BP2 for supporting the second support bar SB2 and coupling (e.g., connecting) the second support bar SB2 to the cover portion CP.

A seating surface MS on which the window WM is seated and a guide bar GB facing the periphery (e.g., the edge) of the window WM are provided at the upper end of each of the first and second support bars SB1 and SB2. Therefore, the first and second support bars SB1 and SB2 support the periphery (e.g., the edge) of the window WM and protect the periphery (e.g., the edge) of the window WM and the curvature area CA from external impacts.

The display device DD according to the present embodiment may further include stoppers STP1 and STP2 for restricting movement of the window WM. The stoppers STP1 and STP2 may be coupled to the protective cover PC. The stoppers STP1 and STP2 may be formed integrally with the protective cover PC.

The stoppers STP1 and STP2 may include a first stopper STP1 and a second stopper STP2. The first stopper STP1 extends from the protective cover PC and is located to correspond with the first strength reinforcing portion TE1 of the window WM. The second stopper STP2 extends from the protective cover PC and is located to correspond with the second strength reinforcing portion TE2 of the window WM.

The first stopper STP1 includes a first protruding portion STP1-B1 and a second protruding portion STP1-B2. The first protruding portion STP1-B1 may be a portion protruding from the protective cover PC in a first direction DR1 parallel to (e.g., substantially parallel to) the first periphery (e.g., the first edge) EG1 of the window WM. The second protruding portion STP1-B2 may be a portion extending from the first protruding portion STP1-B1 and inclined in a direction different from the first direction DR1. The second protruding portion STP1-B2 may protrude in the second direction DR2 from the first protruding portion STP1-B1.

As one example of the present disclosure, the second protruding portion STP1-B2 among the first and second protruding portions STP1-B1 and STP1-B2 may overlap the first strength reinforcing portion TE1. However, the present disclosure is not limited thereto. As another example of the present disclosure, both the first and second protruding portions STP1-B1 and STP1-B2 may overlap the first strength reinforcing portion TE1.

The second stopper STP2 includes a third protruding portion STP2-B1 and a fourth protruding portion STP2-B2. The third protruding portion STP2-B1 may be a portion protruding from the protective cover PC parallel to (e.g., substantially parallel to) the first periphery (e.g., the first edge) EG1 of the window WM. The third protruding portion STP2-B1 may protrude in a direction DR3 opposite to the direction DR1 in which the first protruding portion STP1-B1 protrudes. The fourth protruding portion STP2-B2 may be a portion extending from the third protruding portion STP2-B1 and inclined in a direction different from the first direction DR1. The fourth protruding portion STP2-B2 may protrude in the second direction DR2 from the third protruding portion STP2-B1.

As one example of the present disclosure, the fourth protruding portion STP2-B2 among the third and fourth protruding portions STP2-B1 and STP2-B2 may overlap the second strength reinforcing portion TE2. However, the present disclosure is not limited thereto. As another example of the present disclosure, both the third and fourth protruding portions STP2-B1 and STP2-B2 may overlap the second strength reinforcing portion TE2.

Figure 10A:
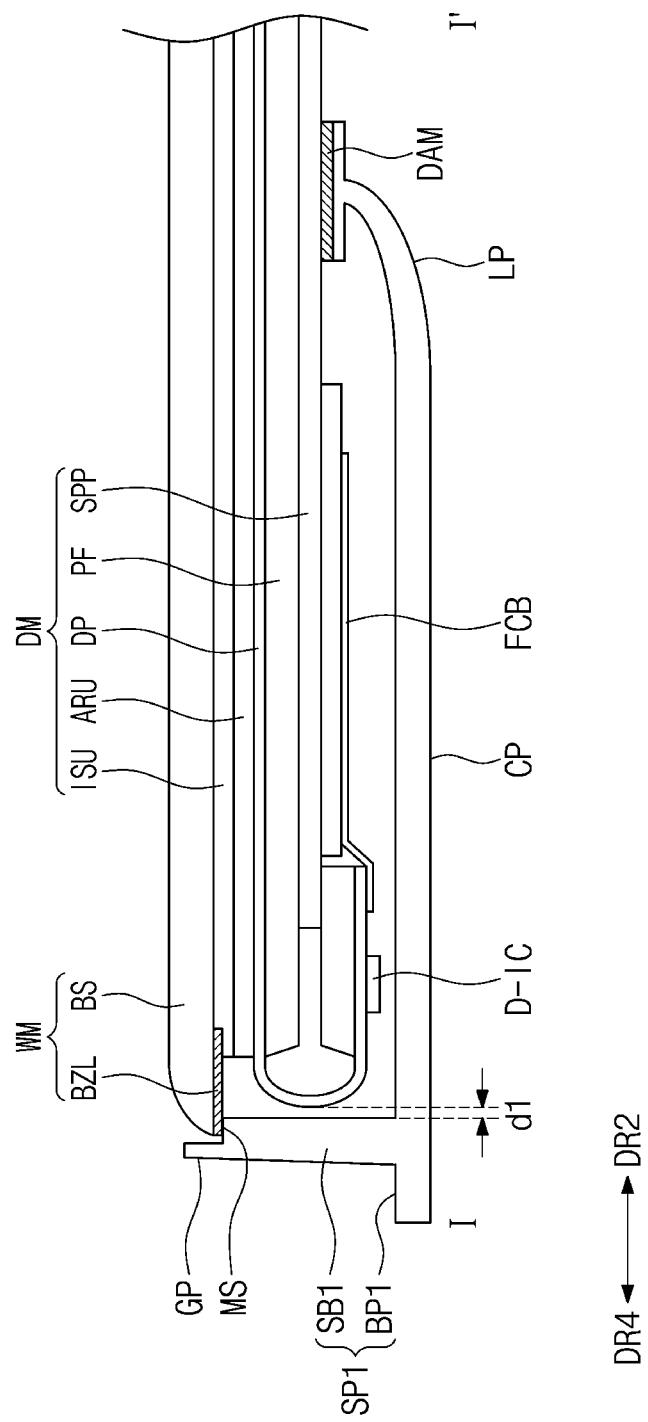
FIG. 10A is a cross-sectional view taken along a line I-I' shown in FIG. 8.
Figure 10B:
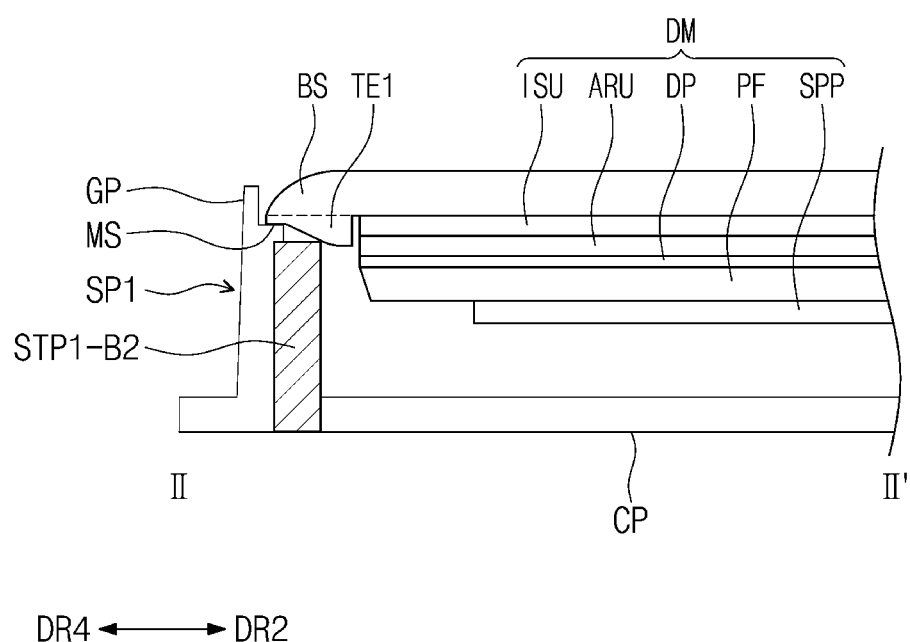
FIG. 10B is a cross-sectional view taken along a line II-II' shown in FIG. 8.

FIG. 10A is a cross-sectional view taken along a cut line I-I' shown in FIG. 8 and FIG. 10B is a cross-sectional view taken along a cut line II-II' of FIG. 8.

Referring to FIGS. 7-10A, the periphery (e.g., the edges) of the window WM are seated on the first and second support bars SB1 and SB2, respectively. As the periphery (e.g., the edge) of the window WM is seated on the seating surface MS of each of the first and second support bars SB1 and SB2, the window WM may be supported by the first and second support bars SB1 and SB2. It is possible to prevent or reduce horizontal movement of the window WM in an outward direction on the seating surface MS by the guide bar GB. Here, the outward direction may be a fourth direction DR4 opposite to the second direction DR2. The second direction DR2 is defined as a direction from the periphery (e.g., the edge) of the window WM toward the side of the display module DM (e.g., the inner side), and the fourth direction DR4 is defined as a direction opposite to the second direction DR2 (e.g., an outward direction).

The protective cover PC further includes a fixing portion FP that affixes (e.g., is for fixing) the protective cover PC to the rear surface of the display module DM. Here, the rear surface of the display module DM may be the rear surface of the support panel SPP. If the support panel SPP is omitted, the rear surface of the display module DM may be the rear surface of the protective film PF. The fixing portion FP has a plate shape, and its upper surface faces the rear surface of the display module DM.

The protective cover PC may further include a double-sided adhesive member DAM that affixes (e.g., is for fixing) the fixing portion FP to the rear surface of the display module DM. A surface of the double-sided adhesive member DAM is attached to the upper surface of the fixing portion FP and the other surface thereof is attached to the rear surface of the support panel SPP in order to fix the position of the protective cover PC. The double-sided adhesive member DAM may be a double-sided adhesive tape. When the protective cover PC is removed, the double-sided adhesive member DAM may be easily separated from the rear surface of the support panel SPP, such that the process of separating the protective cover PC may be facilitated.

In FIG. 7, although the structure using the double-sided adhesive member DAM in a manner of fixing the protective cover PC to the display module DM is shown, the present disclosure is not limited thereto. For example, in order to fix or attach the protective cover PC to the display module DM, the shape of the fixing portion FP and/or the cover portion CP may be processed.

The protective cover PC may further include a connection portion LP extending from one side of the cover portion CP to couple (e.g., connect) the fixing portion FP and the cover portion CP. When the upper surface of the fixing portion FP is defined as a surface facing the rear surface of the support panel SPP, the connection portion LP may be integrally coupled to (e.g., connected to) a rear surface of the fixing portion FP.

The curvature area CA of the display module DM may be covered by the first and second support bars SB1 and SB2 to protect it from external impacts. The first and second support bars SB1 and SB2 and the curvature area CA of the display module DM may be spaced apart by a first interval d1. For example, the first interval d1 may be set to approximately 1.0 mm.

If the first interval d1 is not secured between the first and second support bars SB1 and SB2 and the curvature area CA of the display module DM, the curvature area CA may be damaged due to contacting the first and second support bars SB1 and SB2.

Also, as the bezel width of the window WM decreases, it is difficult to secure a space in which the first and second support bars SB1 and SB2 of the protective cover PC may support the periphery (e.g., the edge portion) of the window WM.

Referring to FIGS. 7-10B, the first and second stoppers STP1 and STP2 may support the first and second strength reinforcing portions TE1 and TE2 of the window WM, respectively.

Even if the window WM is tilted such that the periphery (e.g., the edge) of the window WM may not be seated on the seating surface MS of the first and second support bars SB1 and SB2, the window WM may be supported by the first and second stoppers STP1 and STP2.

Also, the first and second stoppers STP1 and STP2 may secure the first interval d1 to prevent or reduce damage to the curvature area CA. For example, the first and second stoppers STP1 and STP2 may be engaged with the first and second strength reinforcing portions TE1 and TE2 of the window WM, such that it is possible to prevent or reduce movement of the window WM in the outward direction DR4. When the window WM is moved in the outward direction DR4, the first interval d1 may decrease. However, the movement in the outward direction DR4 of the window WM is limited by the first and second stoppers STP1 and STP2. Therefore, even when the window WM is tilted, it is guided by the first and second stoppers STP1 and STP2 such that the first interval d1 may be maintained constant.

As a result, as the display device DD includes the stoppers STP1 and STP2 coupled with the protective cover PC, even in the display device DD having the narrow bezel, the supporting force of the window WM may be strengthened and the bending area BA may be stably protected.

Figure 11:
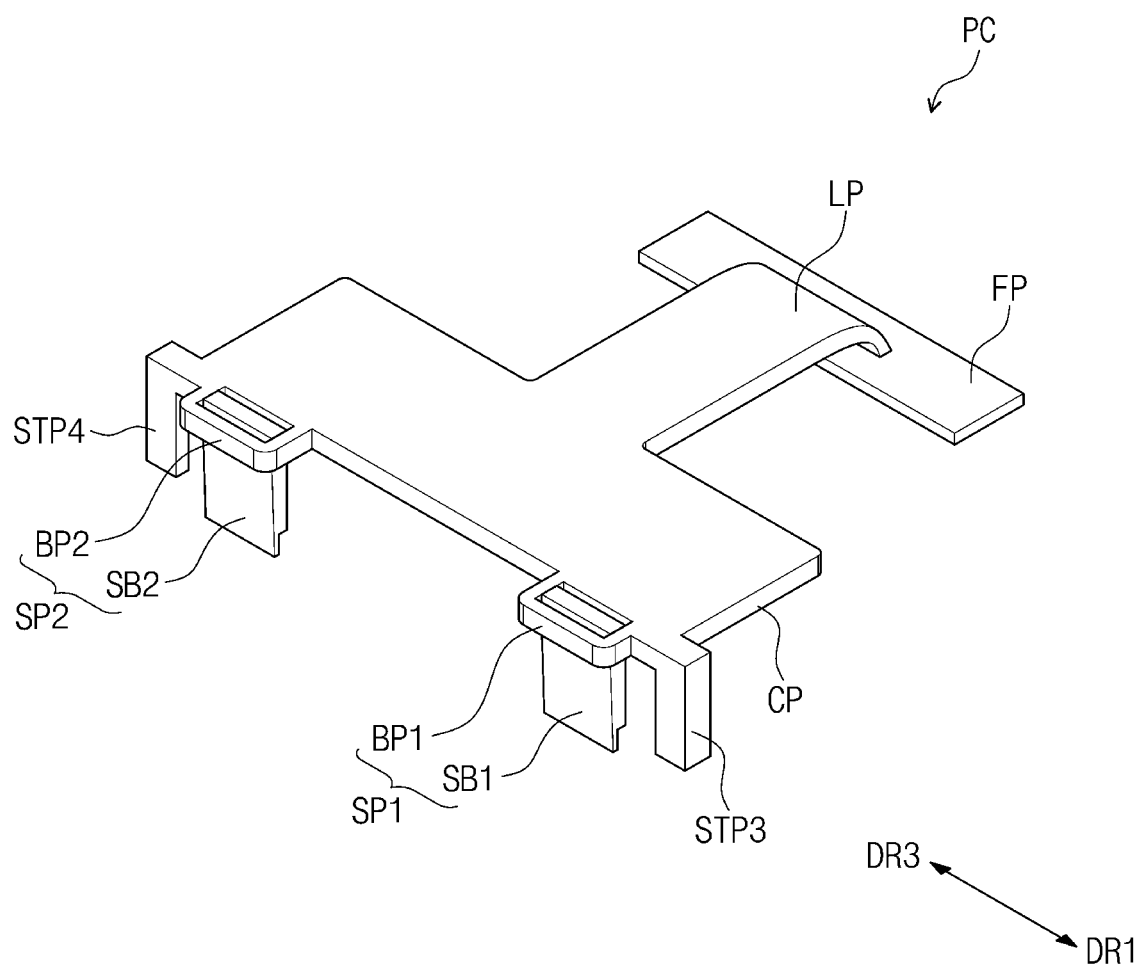
FIG. 11 is a perspective view of a protective color according to another exemplary embodiment of the present disclosure.
Figure 12:
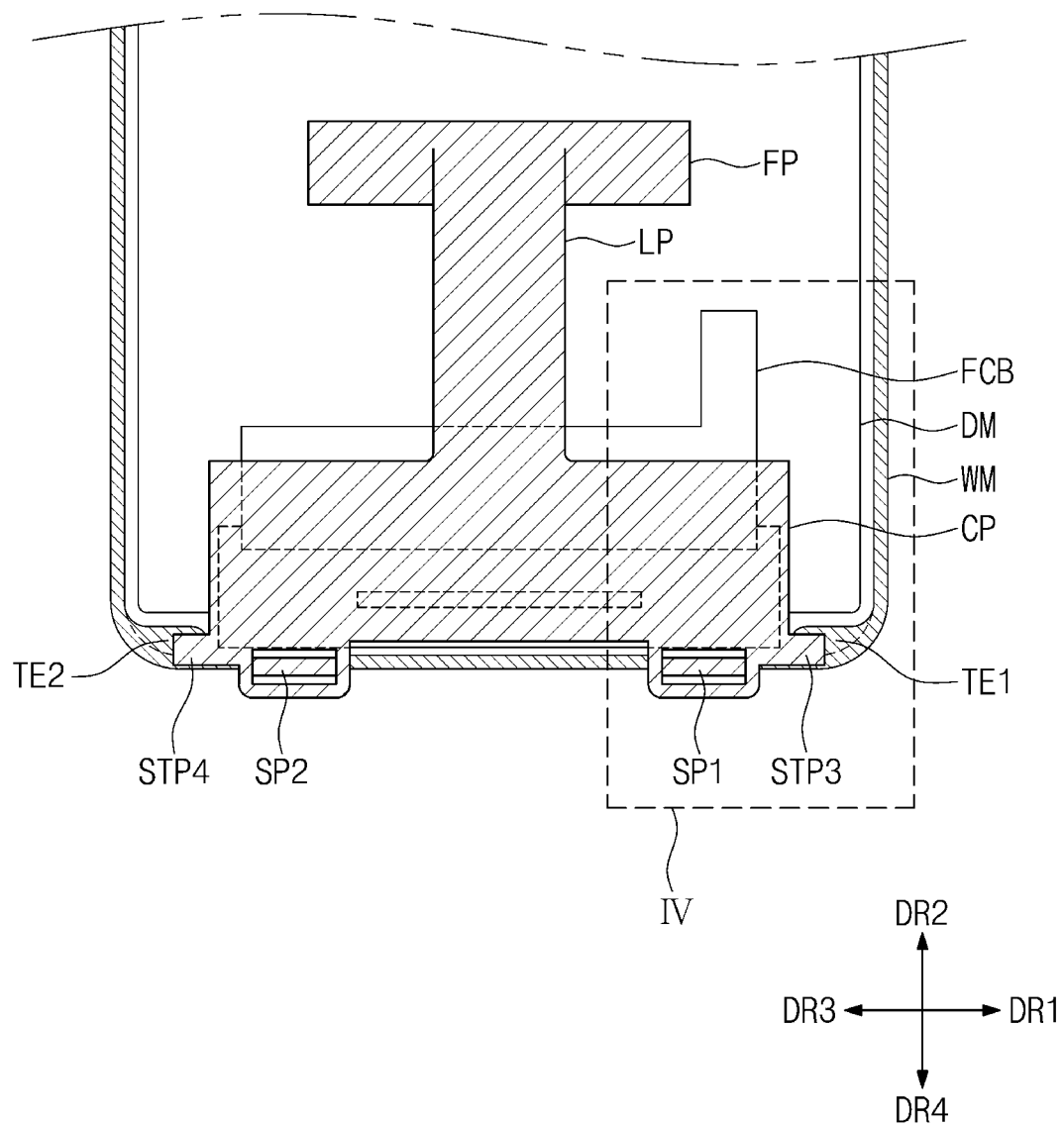
FIG. 12 is a rear surface view of a display device having the protective cover shown in FIG. 11.
Figure 13:
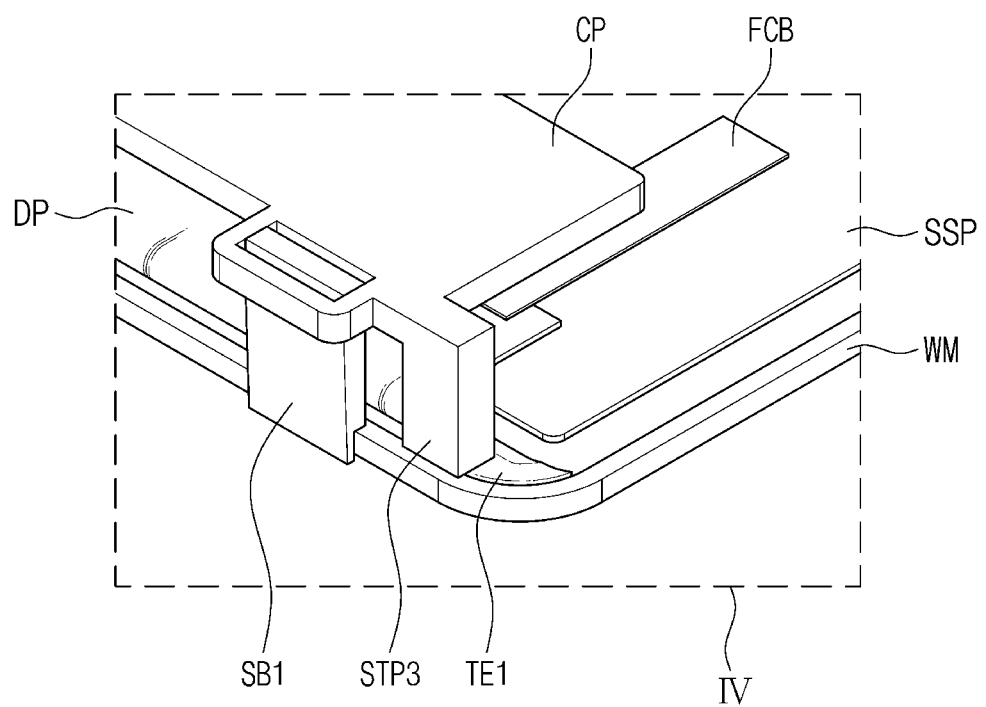
FIG. 13 is an enlarged perspective view of a portion IV shown in FIG. 12.

FIG. 11 is a perspective view of a protective cover according to another embodiment of the present disclosure. FIG. 12 is a rear surface view of a display device having a protective cover shown in FIG. 11. FIG. 13 is an enlarged perspective view of a portion IV shown in FIG. 12.

Referring to FIGS. 11-13, in the display device DD according to another embodiment of the present disclosure, stoppers STP3 and STP4 may be coupled with the protective cover PC. The stoppers STP3 and STP4 may be formed integrally with the protective cover PC.

The stoppers STP3 and STP4 may include a first stopper STP3 and a second stopper STP4. The first stopper STP3 may protrude from the cover portion CP of the protective cover PC in a first direction DR1 parallel to (e.g., substantially parallel to) the first periphery (e.g., the first edge) EG1 of the window WM. The second stopper STP4 may be a portion protruding from the cover portion CP of the protective cover PC in parallel to (e.g., substantially parallel to) the first periphery (e.g., the first edge) EG1 of the window WM. The second stopper STP4 may protrude in a direction DR3 opposite to the direction DR1 in which the first stopper STP3 protrudes.

The first stopper STP3 extends from the protective cover PC and is located to correspond with the first strength reinforcing portion TE1 of the window WM, and the second stopper STP4 extends from the protective cover PC and is located to correspond with the second strength reinforcing portion TE2 of the window WM The first and second stoppers STP3 and STP4 according to the present disclosure may support the first and second strength reinforcing portions TE1 and TE2 of the window WM, respectively.

Even if the window WM is tilted such that the periphery (e.g., the edge) of the window WM may not be seated on the seating surface MS of the first and second support bars SB1 and SB2, the window WM may be supported by the first and second stoppers STP3 and STP4.

Also, the first and second stoppers STP3 and STP4 may secure the first interval d1 (see FIG. 10A) to prevent or reduce damage to the curvature area CA. For example, the first and second stoppers STP3 and STP4 may be engaged with the first and second strength reinforcing portions TE1 and TE2 of the window WM, such that it is possible to prevent or reduce movement of the window WM in the outward direction DR4.

Therefore, movement to the outward direction DR4 of the window WM is limited by the first and second stoppers STP3 and STP4, and as a result, a first interval d1 may be secured between the curvature area CA and the first and second support bars SB1 and SB2.

In such a way, as the display device DD includes the stoppers STP3 and STP4 coupled with the protective cover PC, even in the display device DD having the narrow bezel, the supporting force of the window WM may be strengthened and the bending area BA may be stably protected.

Figure 14:
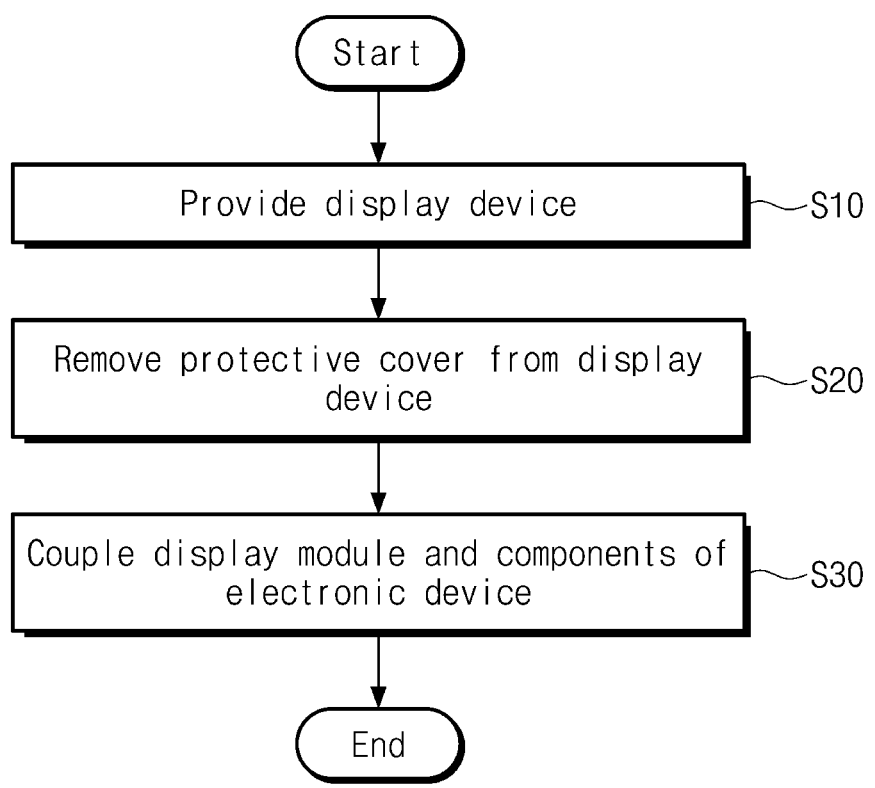
FIG. 14 is a flowchart illustrating a method of manufacturing an electronic device according to an exemplary embodiment of the present disclosure.

FIG. 14 is a flowchart illustrating a method of manufacturing an electronic device according to an embodiment of the present disclosure. The following reference numerals may be defined the same as those in FIGS. 1-13.

First, the display device DD is provided (S10). The display device DD may be the display device DD described with reference to FIGS. 1-13. The display device DD includes the display module DM and the protective cover PC. Therefore, the providing of the display device DD includes installing the protective cover PC on the display module DM such that the window WM is supported by the first and second support bars SB1 and SB2 of the protective cover PC and the movement of the window WM is limited by the first and second stoppers STP1 and STP2 coupled to the protective cover PC.

It is protected by the protective cover PC while the display device DD is transferred, and is guided by the first and second stoppers STP1 and STP2 such that the display module DM may be provided without defects (or with a reduced number or degree of defects).

Next, the protective cover PC is removed from the display module DM (S20).

Then, the display module DM is coupled with the components of the electronic device ED (S30). The components of the electronic device ED may include the external case EDC (see FIG. 2) physically coupled with the display module DM.

When the components of the electronic device ED and the display module DM are physically coupled, adhesive members and additional structures may be used.

According to an exemplary embodiment of the present disclosure, as the display device includes a stopper coupled with the protective cover, it is possible to strengthen the window even in a display device having a narrow bezel, and the bending area of the display module may be stably protected.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Although the exemplary embodiments of the present disclosure have been described, it is understood that the present disclosure should not be limited to these exemplary embodiments but various changes and modifications may be made by one ordinary skilled in the art within the spirit and scope of the present disclosure as hereinafter claimed.

What is claimed is:

1. A display device comprising:
    a window;
    a display module on a rear surface of the window and including a first area and a second area configured to bend at a periphery of the second area;
    a protective cover on a rear surface of the display module to protect the bending area of the display module; and
    a stopper coupled with the protective cover to limit a movement of the window,
    wherein the protective cover comprises:
    a cover portion on a rear surface of the display module; and
    a support portion extending from the cover portion and directly supporting an edge of the window.

2. The display device of claim 1, wherein the stopper comprises a protruding portion protruding from the protective cover.

3. The display device of claim 2, wherein the protruding portion comprises:
    a first protruding portion protruding from the protective cover in a first direction parallel to a first periphery of the window; and
    a second protruding portion obliquely extending from the first protruding portion in a second direction different from the first direction.

4. The display device of claim 3, wherein the window comprises a strength reinforcing portion provided on a corner of the window adjacent the first periphery.

5. The display device of claim 4, wherein the second protruding portion overlaps the strength reinforcing portion and is engaged with the strength reinforcing portion to limit a movement of the window.

6. The display device of claim 4, wherein the window further comprises a base layer,
    wherein the strength reinforcing portion protrudes from the base layer to increase a thickness of the window at the corner.

7. The display device of claim 1, wherein the support portion comprises:
    a bottom portion coupled to the cover portion; and
    a support bar protruding from the bottom portion and having an upper end where a seating surface supports the edge of the window.

8. The display device of claim 1, wherein the protective cover further comprises a fixing portion that affixes the protective cover to the rear surface of the display module.

9. The display device of claim 8, wherein the fixing portion has a plate shape and faces the rear surface of the display module.

10. The display device of claim 9, wherein the protective cover further comprises a double-sided adhesive member that affixes the fixing portion to the rear surface of the display module.

11. The display device of claim 8, wherein the protective cover further comprises a connection portion extending from a side of the cover portion and coupling the fixing portion and the cover portion.

12. The display device of claim 1, wherein the stopper comprises a protruding portion protruding from the protective cover in a first direction parallel to a first periphery of the window,
    wherein the window comprises a strength reinforcing portion provided on a corner of the window adjacent the first periphery.

13. The display device of claim 12, wherein the protruding portion overlaps the strength reinforcing portion, and is engaged with the strength reinforcing portion to limit a movement of the window.

14. The display device of claim 13, wherein the window further comprises a base layer,
wherein the strength reinforcing portion protrudes from the base layer to increase a thickness of the window at the corner.

15. The display device of claim 1, wherein the display module comprises:
a display panel on the rear surface of the window, and located to correspond with the first area and the second area; and
an input sensing unit between the window and the display panel.

16. The display device of claim 15, wherein the second area comprises:
a curvature area adjacent to the first area; and
a facing area adjacent to the curvature area and facing the first area.

17. The display device of claim 16, wherein the protective cover comprises:
a cover portion on a rear surface of the display module; and
a support portion extending from the cover portion and supporting the window.

18. The display device of claim 17, wherein the stopper is engaged with the window to maintain a first interval between the curvature area and the support portion.

19. A manufacturing method of an electronic device, the method comprising:
providing a display device including a window, a display module, a protective cover covering a portion of the display module and a stopper coupled with the protective cover;
removing the protective cover and the stopper from the display device; and
coupling the display module with components of an electronic device,
wherein the display module is disposed on a rear surface of the window and includes a first area and a second area configured to bend at a periphery of the second area, and
wherein before the protective cover and the stopper are removed from the display device:
the protective cover is disposed on a rear surface of the display module to protect the bending area of the display module, and
the stopper is configured to limit a movement of the window.

* * * * *